United States Patent [19]

Easterly

[11] Patent Number: 5,837,062
[45] Date of Patent: Nov. 17, 1998

[54] CATALYST REMOVAL

[75] Inventor: Thomas Peyton Easterly, Friendswood, Tex.

[73] Assignee: Shell Oil Company, Houston, Tex.

[21] Appl. No.: 741,503

[22] Filed: Oct. 31, 1996

[51] Int. Cl.$^6$ ................................. B08B 7/00; B08B 9/03
[52] U.S. Cl. ................................ 134/6; 134/22.11; 134/8; 422/197; 15/104.05; 15/104.16
[58] Field of Search ................................ 134/22.11, 6, 8; 422/197; 15/104.05, 104.16

[56] References Cited

U.S. PATENT DOCUMENTS 4,280,983  7/1981  Irwin ........................................ 422/219

*Primary Examiner*—Marian C. Knode
*Assistant Examiner*—Ali R. Salimi
*Attorney, Agent, or Firm*—Fred Marlowe

[57] ABSTRACT

The present invention involves the removal of catalyst particles adhering to catalyst tubes by means of automated ram rods. The rods are moved up and down in the catalyst tubes by means of rotating wheels having cams which cyclically raise and drop the rods.

8 Claims, 2 Drawing Sheets

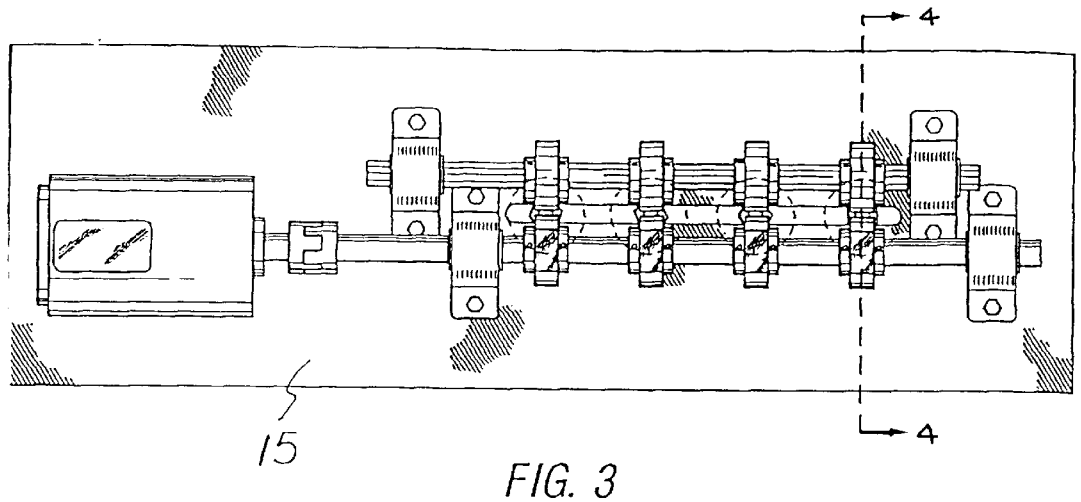
FIG. 3
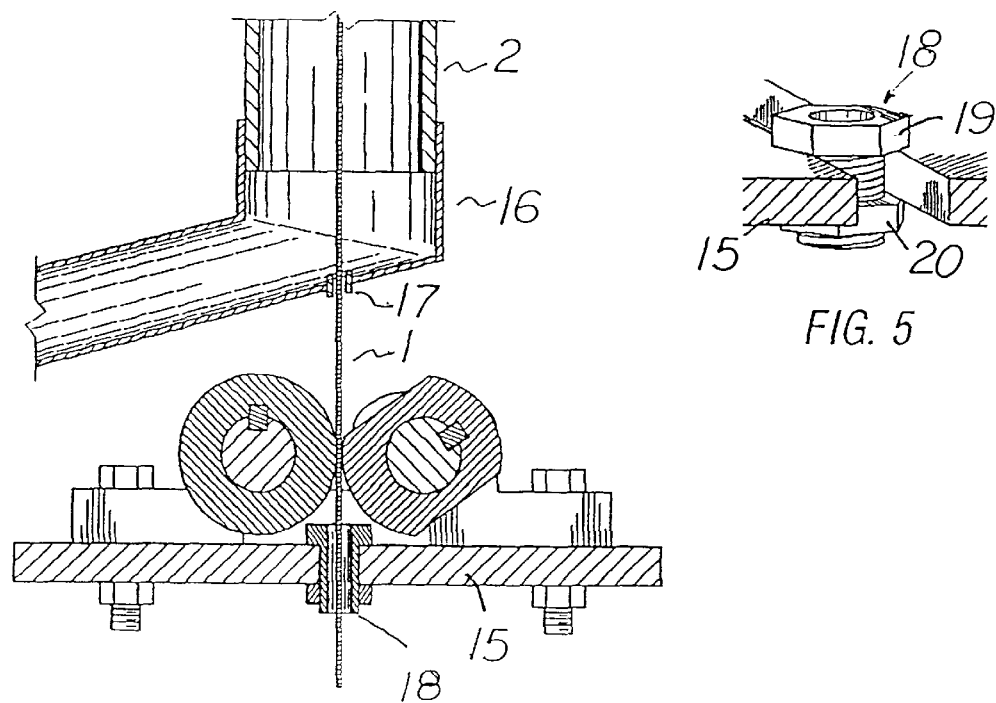
FIG. 4
FIG. 5

CATALYST REMOVAL

BACKGROUND OF THE INVENTION

This invention relates to a process and apparatus for removing catalyst adhering to catalyst tubes.

It is now the practice in the art to remove catalyst adhering to catalyst tubes by a labor intensive method requiring insertion of a rod into each tube separately and ramming the catalyst out by hand. This is very time consuming, and it considerably increases the down time of the catalytic reactor. In order to increase productivity it is the practice in the art for workers to handle more than one rod at the time, and there are some reports of a worker being able to handle up to ten rods at one time. Needless to say, this is not possible for most workers, and as a result the operation is very inefficient.

SUMMARY OF THE INVENTION

The present invention provides an apparatus and method of removing catalyst particles adhering to catalyst tubes by means of automated ran rods. The rods are moved up and down in the catalyst tubes by means of rotating cams which cyclically raise and drop the rods.

BRIEF DESCRIPTION OF THE DRAWINGS

FIG. 3 shows an overhead view of the apparatus of FIG. 1.

FIG. 4 shows the section of designated in FIG 3.

FIG. 5 shows details of the apparatus guide.

DETAILED DESCRIPTION OF THE INVENTION

Figure 1:
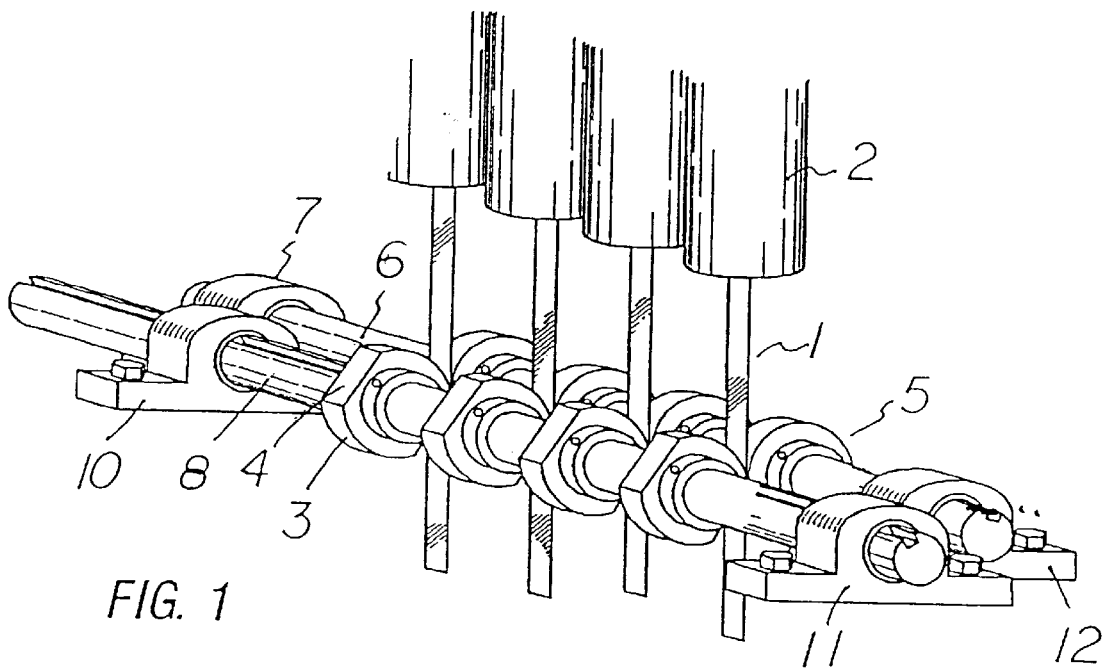
FIG. 1 shows one embodiment of the invention having multiple drive wheels.

As may be seen in FIG. 1 a flexible metal tape 1 such as electrician's fish tape is inserted into catalyst tube 2. Drive wheel 3 has a cammed surface 4. Tape 1 is held between drive wheel 3 and drive wheel 5 which in turn is locked to rotating rod 6 which is powered by motor 7. Drive wheels 3 are locked to rotating rod 8 which is free wheeling. The cammed surfaces may be aligned as shown in FIG. 1 or they may be staggered (not shown). The staggered arrangement is actually preferred since a smaller motor is required inasmuch as not all of the tapes are driven up at the same time. Bearing supports 10, 11 and 12 facilitate the rotation of rods 6 and 8. The entire apparatus shown in FIG. 1 is supported by a movable structure (not shown). The drive wheels 3 and 5 may be covered by a resilient surface which is readily replaceable (not shown).

Figure 2:
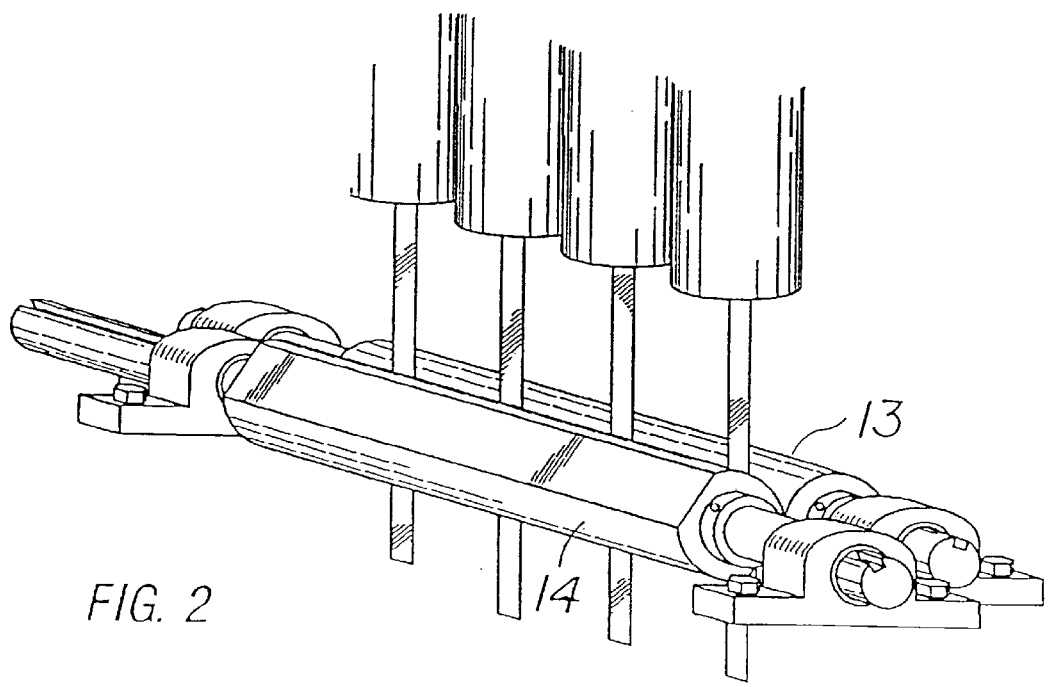
FIG. 2 shows another embodiment of the invention having elongated drive wheels.

FIG. 2 shows a species of the invention which is more simple than the species of FIG. 1 inasmuch as multiple drive wheels 3 and 5 are replaced by two elongated drive wheels 13 and 14. Though more simple than the arrangement of FIG. 1, this arrangement suffers the disadvantage of requiring a larger motor since all of the tapes 1 are driven up at the same time.

An overhead view of the apparatus is shown in FIG. 3. As can be seen in this view, the entire apparatus is supported by a movable table 15. A section of the apparatus along lines AA is shown in FIG. 4. This view shows the flexible tape 1 extending upwardly through a collection shute 16, which in turn is attached to catalyst tube 2. Tape 1 passes through an orifice 18 in shute 16 and then up into tube 2. A guide 18 is provided in table 15 for each of the tapes 1. FIG. 5 shows the details of guide 18. A bolt 19 having an opening therethrough is attached to table 15 by tightening nut 20.

What is claimed is:

1. A method for dislodging catalyst particles stuck inside catalyst tubes comprising:

inserting a ram rod into one or more of the catalyst tubes;

moving the rod to ram the catalyst by a rotating means having cams which cyclically raise and drop the rods; and removing said catalyst.

2. The method of claim 1 wherein the rotating means is a wheel.

3. The method of claim 1 wherein the rotating means is an elongated drive wheel.

4. The method of claim 3 wherein a series of ram rods are driven up and down simultaneously.

5. The method of claim 2 wherein a series of ram rods are driven up and down independently.

6. An apparatus for dislodging catalyst particles stuck inside catalyst tubes comprising:

ram rods insertable into one or more catalyst tubes; and means for moving the rods to ram the catalyst by a rotating means having cams which cyclically raise and drop the rods.

7. The apparatus of claim 6 wherein the rotating means is a wheel.

8. The apparatus of claim 6 wherein the rotating means is an elongated drive wheel.

* * * * *